(12) United States Patent
Klischat et al.

(10) Patent No.: US 11,440,847 B2
(45) Date of Patent: Sep. 13, 2022

(54) METHOD FOR PRODUCING A POROUS SINTERED MAGNESIA, BACKFILL FOR PRODUCING A HEAVY-CLAY REFRACTORY PRODUCT WITH A GRANULATION FROM THE SINTERED MAGNESIA, PRODUCT OF THIS TYPE, AND METHOD FOR THE PRODUCTION THEREOF, LINING OF AN INDUSTRIAL FURNACE AND INDUSTRIAL FURNACE

(71) Applicant: REFRATECHNIK HOLDING GMBH, Ismaning (DE)

(72) Inventors: Hans-Jürgen Klischat, Göttingen (DE); Robert Plummer, Shandong (CN); Carsten Vellmer, Göttingen (DE); Holger Wirsing, Göttingen (DE)

(73) Assignee: REFRATECHNIK HOLDING GMBH, Ismaning (DE)

(*) Notice: Subject to any disclaimer, the term of this patent is extended or adjusted under 35 U.S.C. 154(b) by 0 days.

(21) Appl. No.: 16/646,409

(22) PCT Filed: Sep. 13, 2018

(86) PCT No.: PCT/EP2018/074817
§ 371 (c)(1),
(2) Date: Mar. 11, 2020

(87) PCT Pub. No.: WO2019/053167
PCT Pub. Date: Mar. 21, 2019

(65) Prior Publication Data
US 2020/0277231 A1    Sep. 3, 2020

(30) Foreign Application Priority Data

Sep. 15, 2017   (DE) .................. 10 2017 121 452.6

(51) Int. Cl.
*C04B 35/043*      (2006.01)
*C04B 35/626*      (2006.01)
(Continued)

(52) U.S. Cl.
CPC ...... *C04B 35/0435* (2013.01); *C04B 35/6264* (2013.01); *C04B 35/63* (2013.01);
(Continued)

(58) Field of Classification Search
CPC . C04B 35/0435; C04B 35/6264; C04B 35/63; C04B 35/66; C04B 38/0058;
(Continued)

(56) References Cited

U.S. PATENT DOCUMENTS 4,627,878 A   12/1986   Hagiwara et al.
4,927,611 A    5/1990   Yamamoto et al.
(Continued)

FOREIGN PATENT DOCUMENTS

CN    101066879 A    11/2007
CN    102765950 A    11/2012
(Continued)

OTHER PUBLICATIONS

DE202013012201 Machine Translation (Year: 2015).*
(Continued)

*Primary Examiner* — Karl E Group
*Assistant Examiner* — Cameron K Miller
(74) *Attorney, Agent, or Firm* — Greer, Burns & Crain, Ltd.

(57) ABSTRACT

A method for producing a granular material from sintered magnesia by sintering of pressed articles, in particular pellets, from MgO powder, preferably from caustic MgO powder, and subsequent mechanical comminution of the pressed articles, the sintering being carried out in such a way that the granular material has a grain porosity (total poros-
(Continued)

ity), according to DIN EN 993-1:1195-04 and DIN EN 993-18:1999-01, of from 15 to 38 vol %, preferably 20 to 38 vol %. Also, a batch for producing a coarse ceramic, refractory, shaped or unshaped product containing the porous sintered magnesia, to such a product produced from the batch and to a method for its production, to a lining, in particular a working casing and/or a backing, of a large-volume industrial furnace, the lining, in particular the working casing and/or the backing, having at least one such product, as well as to such an industrial furnace.

47 Claims, 3 Drawing Sheets

(51) Int. Cl.
  *C04B 35/63* (2006.01)
  *C04B 35/66* (2006.01)
  *C04B 38/00* (2006.01)
(52) U.S. Cl.
  CPC .......... *C04B 35/66* (2013.01); *C04B 38/0058* (2013.01); *C04B 2235/327* (2013.01); *C04B 2235/3208* (2013.01); *C04B 2235/3222* (2013.01); *C04B 2235/3241* (2013.01); *C04B 2235/3244* (2013.01); *C04B 2235/3445* (2013.01); *C04B 2235/404* (2013.01)
(58) Field of Classification Search
  CPC .... C04B 2235/3208; C04B 2235/3222; C04B 2235/3241; C04B 2235/3244; C04B 2235/327; C04B 2235/3445; C04B 2235/404
  See application file for complete search history.

(56) References Cited

U.S. PATENT DOCUMENTS

| | | | |
|---|---|---|---|
| 7,244,687 | B2 | 7/2007 | Eder et al. |
| 9,809,498 | B2 | 11/2017 | Klischat et al. |
| 10,155,696 | B2 | 12/2018 | Eckstein |
| 2006/0122051 | A1 | 6/2006 | Eder et al. |
| 2010/0093515 | A1* | 4/2010 | Jansen ................. C04B 35/043 501/101 |
| 2010/0294657 | A1 | 11/2010 | Nagano et al. |
| 2015/0087496 | A1 | 3/2015 | Harmuth et al. |
| 2016/0115080 | A1 | 4/2016 | Eckstein |
| 2016/0176762 | A1 | 6/2016 | Jansen et al. |
| 2016/0304403 | A1 | 10/2016 | Klischat et al. |
| 2019/0185378 | A1* | 6/2019 | Liever ..................... C04B 35/66 |

FOREIGN PATENT DOCUMENTS

| | | | |
|---|---|---|---|
| CN | 102850044 A | | 1/2013 |
| CN | 105980330 A | | 10/2014 |
| CN | 106747594 | * | 5/2017 |
| CN | 106747594 A | | 5/2017 |
| DE | 102006040269 A1 | | 3/2008 |
| DE | 202007018373 U1 | | 8/2008 |
| DE | 102008019529 A1 | | 10/2009 |
| DE | 102013010854 A1 | | 12/2014 |
| DE | 102013020732 A1 | | 6/2015 |
| DE | 202013012201 | * | 8/2015 |
| DE | 202013012201 U1 | | 8/2015 |
| EP | 0081794 A1 * | | 6/1983 ............. B22D 1/005 |
| EP | 0081794 A1 | | 6/1983 |
| EP | 2674407 A1 | | 12/2013 |
| EP | 2813481 A1 | | 12/2014 |
| EP | 2883853 A1 | | 6/2015 |
| GB | 1408833 | | 10/1975 |
| JP | 2004244313 A | | 9/2004 |
| SU | 1337368 A | | 9/1987 |
| WO | 0032536 | | 6/2000 |
| WO | 2004065323 A1 | | 8/2004 |

OTHER PUBLICATIONS

CN106747594 Machine Translation (Year: 2017).*
I.Ya. Guzman, The Chemical Technology of Ceramics, Stroimaterialy LLC, 2006, p. 416, paragraph 5 to p. 417. paragraph 4.
Yan, Wen, et al., Preparation and characterization of porous MgO—Al2O3 refractory aggregates using an in-situ decomposition pore-forming technique, Ceramics International 41, pp. 515-520, 2015.
Lin, Xiaoli, et al., Effect of Spinel Content on the Reaction of Porous Periclase-Spinel Ceramics and Cement Clinker, Key Engineering Materials, ISSN: 1662-9795, vol. 697, pp. 581-585, 2016. (Abstract only).
International Search Report from PCT/EP2018/074817, dated Jan. 3, 2019.
Yan, Wen, et al., Effect of Spinel Content of Lightweight Aggregates on the Reaction Characteristics of Periclase-Spinel Refractories with Cement Clinker, Proceeding 128, UNITECR 2015, ISBN 978-3-09815813-1-7, China.

* cited by examiner

METHOD FOR PRODUCING A POROUS SINTERED MAGNESIA, BACKFILL FOR PRODUCING A HEAVY-CLAY REFRACTORY PRODUCT WITH A GRANULATION FROM THE SINTERED MAGNESIA, PRODUCT OF THIS TYPE, AND METHOD FOR THE PRODUCTION THEREOF, LINING OF AN INDUSTRIAL FURNACE AND INDUSTRIAL FURNACE

RELATED APPLICATIONS

This application is a U.S. National Phase under 35 U.S.C. § 371 of International Application No. PCT/EP2018/074817, filed Sep. 13, 2018, which claims priority to German Patent Application No. 10 2017 121 452.6, filed Sep. 15, 2017, the entireties of which are hereby incorporated by reference.

FIELD OF THE INVENTION

The present invention relates to a method for producing a porous sintered magnesia and to a batch for producing a coarse ceramic, refractory, shaped or unshaped product containing the porous sintered magnesia. The present invention also relates to such a product produced from the batch, and to a method for its production. In addition, the present invention relates to a lining, in particular a working casing and/or a backing, of a large-volume industrial furnace, the lining, in particular the working casing and/or the backing, having at least one such product, and to such an industrial furnace.

In the context of the present invention, the term "refractory" is not intended to be limited to the definition according to ISO 836, or DIN 501060, which define a pyrometric cone equivalent of >1500° C. Refractory products in the sense of the present invention have a compression softening point $T_{0.5}$ according to DIN EN ISO 1893: 2009-09 of $T_{0.5} \geq 600°$ C., preferably $T_{0.5} \geq 800°$ C. Accordingly, refractory, or fire-resistant, grainy materials, or granular materials in the sense of the present invention, are those materials, or granular materials, that are suitable for a refractory product having the above-mentioned compression softening point $T_{0.5}$. The refractory products according to the present invention are used for the protection of aggregate constructions in aggregates in which temperatures of between 600 and 2000° C., in particular between 1000 and 1800° C., predominate.

In the sense of the present invention, the term "granular material" or "grainy material" includes a pourable material made up of a large number of small solid grains. If the grains have a grain size ≤200 μm, the granular material is a meal or powder. The grains are produced by mechanical comminution, e.g. breaking and/or grinding. The grain distribution of the granular material is usually adjusted by sieving.

BACKGROUND OF THE INVENTION

Persons skilled in the art know that refractory materials are based on six refractory base oxides, as well as carbon and refractory carbon compounds, which are named and classified for example in Gerald Routschka/Hartmut Wuthnow, Practical Handbook "Feuerfeste Werkstoffe [Refractory materials]," 5th ed., Vulkan-Verlag (hereinafter referred to simply as "Practical Handbook"), pages 1-7". According to DIN EN ISO 10081:2005-05, a distinction is made between non-basic and basic refractory products, based on their chemical reaction behavior. The product group of non-basic products includes the materials of the $SiO_2$—$Al_2O_3$ series, and other materials that cannot be classified more precisely according to their chemical reaction behavior, such as SiC products and carbon products. The materials having a high content of $SiO_2$ are designated acidic. An essential feature of most basic products is that the sum of the oxides MgO and CaO predominates. In addition, chromite, picochromite, spinel, and forsterite bricks are considered to be among the basic products, although they are almost neutral. The shaped basic products include in particular products containing magnesia, in particular magnesia products, magnesia chromite products, magnesia spinel products, magnesia zirconia products, magnesia pleonaste products, magnesia galaxite products, magnesia hercynite products, magnesia doloma products (see e.g. Practical Handbook, page 99, Table 4.26). Basic unshaped products are products whose aggregates are substantially made up of magnesia, dolomite, chromium magnesia, chromium ore, and spinel (see e.g. Practical Handbook, page 146).

Typical magnesia raw materials for producing magnesia products are granular materials, or granulates, of sintered and/or fused magnesia. Sintered magnesia is produced by firing at a temperature of >1700° C., preferably >1800° C., in order to achieve the highest possible grain bulk density. Fused magnesia is produced at a temperature >2800° C., in order to likewise achieve the highest possible grain bulk density and the lowest possible grain porosity. Standard sintered magnesia types have a grain bulk density of >3.10 g/cm³. Values of >3.30-3.40 g/cm³ are sought. The corresponding grain porosities (total porosity) are standardly 4-10 vol %. Granular materials of fused magnesia usually have a grain bulk density of >3.50 g/cm³, with a grain porosity (total porosity)<2.5 vol %.

Shaped products according to the present invention are ceramically fired or unfired, in particular pressed, products, preferably produced in a ceramic factory, in particular bricks or plates. The shaped products, in particular the bricks, are used to form the kiln lining or the kiln backing, preferably walled using mortar or without mortar (laid tightly against one another). The unshaped products according to the present invention are products that are produced, mostly by the user, from an unshaped mass, e.g. through casting or injection. Unshaped products are installed in larger sections at the location of use, usually behind molds, and after hardening form the kiln lining or the kiln backing.

The products according to the present invention are preferably used in industrial firing aggregates or melting aggregates, or in other fired industrial aggregates, e.g. in a large-volume industrial furnace in order to form a refractory, fire-sided lining or aggregate inner lining (working casing) thereof. Preferably, they are used as working casings in burning kilns used in non-metal industry, preferably in cement kiln installations, lime shaft kilns or lime rotary kilns, or heating kilns, or kilns for energy production, or in kilns in steel production or in nonferrous metal industry. The products according to the present invention can also be used as insulating backing in one of the named kilns. Refractory products of these types should therefore have low thermal conductivity and a high resistance to infiltration. In addition, they should ensure good thermal resistance at temperatures of use, good chemical resistance, thermal shock resistance, good structural elasticity, appropriate compression softening and low gas permeability, and high heat bending strength. In addition, the shaped products should have a cold compression strength that is adapted to the intended use, and that in particular should be sufficiently high for their handling during and after their production and after temperature shocks.

Refractory products of this type are known from DE 10 2006 040 269 A1 and from DE 10 2013 020 732 A1. In these products, a desired porosity is set via the grain size distribution:

From DE 10 2006 040 269 A1, fired coarse ceramic refractory products made of various refractory materials are known that can be used as working casing, and that may well also have a relatively low thermal conductivity due to an open porosity >10 vol %. These are fine-grained products made from a batch that has 50-90 wt % fine particulate refractory material having a grain size $d_{90}$<100 μm, the portion of grain size $d_{90}$ between 100-500 μm being limited to ≤10 wt %. This results in a coarse-grained fraction of 10-50 wt % with $d_{90}$>500 μm, the specific grain selection of the batch being decisive for the microstructure of the fired product and its properties. The open porosity of the products is made up, by more than half, of pores having a diameter $d_{90}$<15 μm, and more than 1/10 of pores having a diameter $d_{90}$>100 μm. Here, the pore portion between 15 and 100 μm is a maximum of 1/7 of the total open porosity.

From DE 10 2013 020 732 A1, a coarse ceramic refractory product made of at least one grainy refractory material is known that has an open porosity between 22 and 45 vol %, in particular between 23 and 29 vol %, and that has a grain structure in which the medium-grained fraction, having grain sizes between 0.1 and 0.5 mm, is from 10 to 55 wt %, in particular 35 to 50 wt %, the rest of the grain structure being a powdered grain fraction having grain sizes up to 0.1 mm and/or a coarse-grained portion having grain sizes larger than 0.5 mm. The refractory product is used in particular to produce a working casing of a large-volume industrial furnace.

U.S. Pat. No. 4,927,611 describes a magnesia clinker having a porosity of >40 vol %, preferably in the range of 50 to 70 vol %, and a grain bulk density of <2.0 g/cm$^3$. In addition, more than 90 vol % of the pores have a pore size <50 μm. The production of the magnesia clinker takes place through granulation of a component that forms magnesium oxide, having a grain size of <150 μm (100 mesh) and a burnout material in an additional quantity of 10-40 wt %, as well as the addition of 1-15% of a magnesium salt and subsequent firing at 1300 to 1600° C. The magnesia clinker produced in this way is used in injectable suspensions in order to coat nozzles and distributor troughs.

The use of lightweight basic granular materials based on magnesia spinels is also known from Wen Yan et al., "Effect of Spinel Content of lightweight aggregates on the reaction characteristics of periclase-spinel refractories with cement clinker," in Proc. 128, UNITECR 2015, and from Wen Yan et al., "Effect of Spinel Content on the Reaction of Porous Periclase-Spinel Ceramics and Cement Clinker," in Key Engineering Materials, Vol. 697, pp. 581-585. According to these references, granular materials are produced from MgO and from MgO-spinel mixtures, i.e. MgO or MgO-spinel co-clinker, having a porosity of from 24.8-30.0 vol %, and are subsequently mixed with magnesia as a matrix, shaped, and fired at a temperature of 1550° C. These shaped products are characterized by a porosity of approximately 30 vol %. MgO grains have, in their pore size distribution, a maximum at a pore diameter of 50 μm; the average pore diameter of the MgO-spinel co-clinker grains is indicated by values between 11.33 μm and 27.58 μm, and the average pore diameter of the matrix is 50.52 μm. In general, as the spinel content increases the susceptibility to cement clinker attack also increases. The highest resistances are shown by a pure magnesia product and a product having a co-clinker of 75% magnesia and 25% spinel. Other technologically important variables, such as strength, refractoriness, elasticity (modulus of elasticity, shear modulus), resistance to thermal shock, volume stability, etc., are not named. It can therefore be presumed that such bricks cannot be used in a cement rotary kiln due to inadequate technological properties. Notable is the large pore diameter, which suggests the use of burnout materials for the pore formation (organic compounds, hydroxides, carbonates), which are also described by the same author (Wen Yan et al., "Preparation and characterization of porous MgO—Al$_2$O$_3$ refractory aggregates using an in-situ decomposition pore-forming technique," Ceram. Int., January 2015, pp. 515-520).

CN 106747594 A discloses the production of granular materials from a mixture of 5-95 wt % caustic MgO meal and 5-95 wt % magnesite meal. These mixtures are mixed with lignosulfonate and pressed to form pressed articles. The pressed articles are dried for 20 to 50 hours, and are subsequently fired at 1450-1700° C. in a tunnel kiln or shuttle kiln for 10-20 hours. Granular materials produced for example having 95 wt % caustic MgO meal and 5 wt % magnesite meal have a porosity of 16.5 vol % and a density of 2.97 g/cm$^3$.

SUMMARY OF THE PRESENT INVENTION

An object of the present invention is to provide a sintered magnesia having good grain strength for a batch for the production of refractory products having high porosity and low thermal conductivity, and having properties suitable for use in large-volume industrial furnaces, and in particular having a low tendency to infiltration with regard to alkali infiltration.

A further object of the present invention is the provision of such a batch, as well as of a shaped or unshaped refractory product produced from the batch, as well as a method for its production.

In addition, another object of the present invention is the provision of a refractory lining of a large-volume industrial furnace, in particular a burning kiln of the non-metal industry, preferably a cement kiln installation, a lime shaft kiln or lime rotary kiln, a kiln for producing magnesia or doloma, or heating kiln or a kiln for energy production, or a kiln of the non-ferrous or steel industry, having or being formed from at least one product according to the present invention.

The lining can for example be multilayered, and can have a fire-sided or heat-sided working casing, or an aggregate inner-sided cladding and an insulating backing situated behind the cladding.

These objects may be achieved by the features of various embodiments described herein. Advantageous specific embodiments of the present invention are characterized in by further embodiments described herein.

DESCRIPTION OF THE DRAWINGS

In the following, the present invention is explained in exemplary fashion on the basis of a drawing.

DETAILED DESCRIPTION OF THE PRESENT INVENTION

Figure 1:
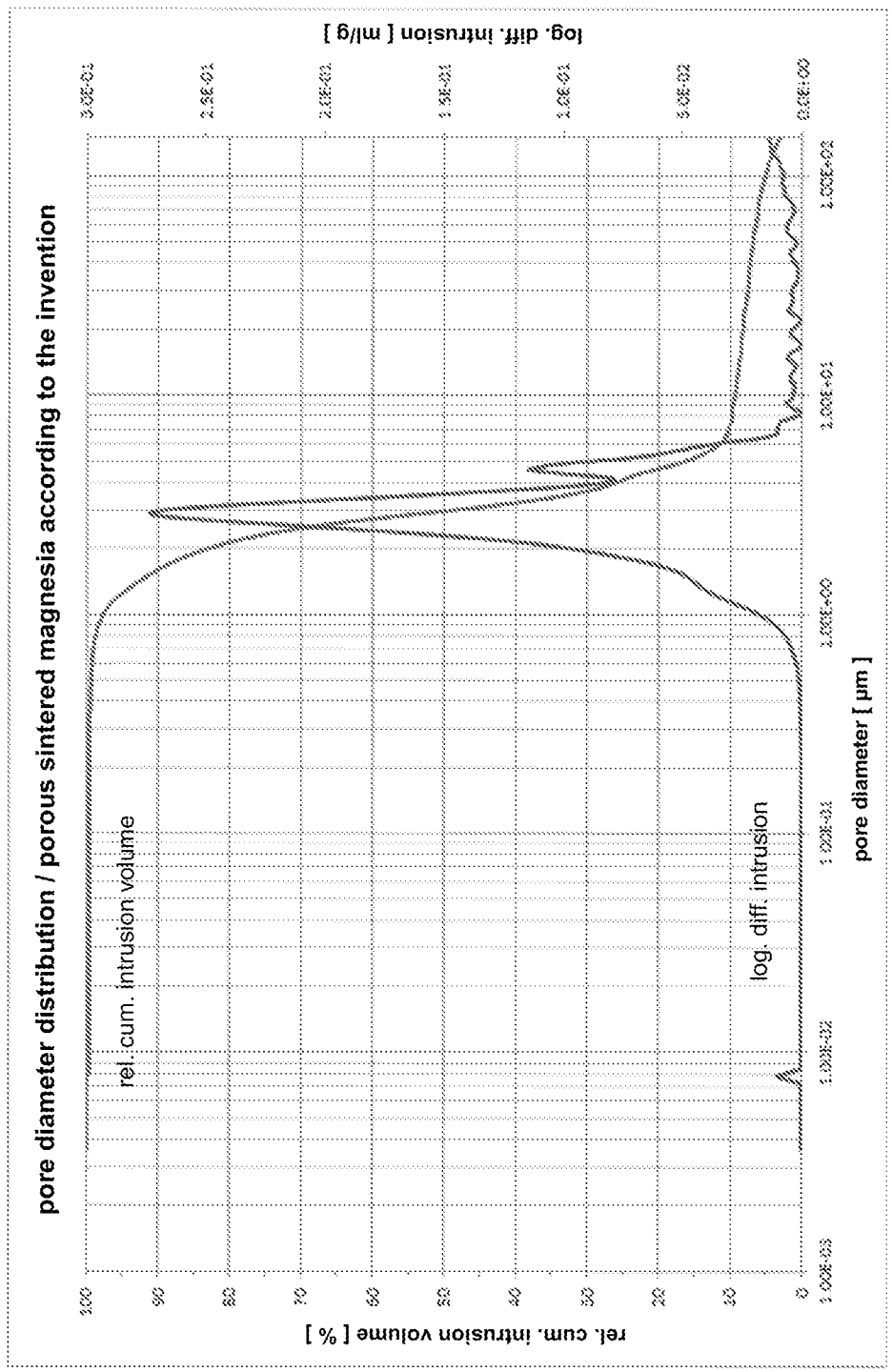
FIG. 1 shows, as an example, a pore diameter distribution of a granular material according to the present invention made of porous sintered magnesia.

In the context of the present invention, it has been surprisingly discovered that by sintering of pressed articles, in particular pellets, from MgO meal, preferably caustic MgO meal, at a reduced maximum temperature (instead of the standard temperatures of >1700° C.), and subsequent mechanical comminution of the pressed articles, it sintered magnesia can be produced that has a grain porosity (total porosity) according to DIN EN 993-1:1995-04 and DIN EN 993-18:2002-11 of 15 to 38 vol %, preferably 20 to 38 vol %.

The MgO meal can also be made up for example of dead-burned magnesia (DBM) or fused magnesia. However, it is preferably caustic MgO meal.

And, using this granular, porous sintered magnesia, refractory products can be produced having typical mechanical and chemical properties, having higher porosity and therefore lower thermal conductivity compared to the products previously used, but nonetheless having low tendency to infiltration.

In particular, in the context of the present invention it has been discovered that, it is possible, without the addition of burnout materials, solely through a reduced maximum firing temperature instead of the standard temperatures >1700° C., to produce a granular material made of sintered magnesia from the pressed articles made of MgO meal grains, preferably caustic MgO particles, having, compared to known sintered magnesia and fused magnesia, a significantly lower grain bulk density and significantly higher porosity, in turn resulting in the improved properties of the products produced therefrom.

The firing duration and the sintering temperatures, i.e. the temperature curve or temperature regime or temperature profile, of the sintering, or of the sintering process, are also set according to the present invention in such a way that the granular material according to the present invention made of porous sintered magnesia has a grain porosity (total porosity) according to DIN 993-18:2002-11 and DIN 993-1:1995-4 of 15 to 38 vol %, preferably 20 to 38 vol %, and preferably has a grain bulk density according to DIN 993-18:2002-11 of 2.20 to 2.85 g/cm$^3$, preferably 2.20 to 2.75 g/cm$^3$. Thereby, for example, the temperature regime depends on the type of magnesia (its reactivity) and the particle size of the MgO meal.

Preferably, the sintering takes place at a maximum temperature ≤1600° C., preferably ≤1550° C., more preferably ≤1500° C., particularly preferably ≤1400° C.

That is, the sintering preferably takes place at a maximum temperature of between 1100-1600° C., preferably between 1200-1600° C., more preferably between 1200-1550° C., particularly preferably between 1200-1500° C.

The firing duration at the maximum temperature for the production of the sintered magnesia according to the present invention is preferably from 0.5 h to 7 h, preferably 2 h to 6 h. The total firing duration preferably corresponds to that of the standard production of sintered magnesia.

The firing preferably takes place in an oxidizing atmosphere, but can also take place in a reducing atmosphere. After the firing, the sintered magnesia is mechanically comminuted, in particular broken, and is classified by sieving.

The used mealy MgO causter or caustic MgO meal is preferably produced in the standard manner from magnesium hydroxide or from magnesium carbonate.

In addition, the MgO meal, preferably the caustic MgO meal, that is used preferably has a particle size distribution having the following values:

$d_{90}$ between 80 and 100 μm and/or $d_{50}$ between 5 and 15 μm and/or $d_{10}$ between 1 and 3 μm. As is known, the $d_x$ value means that x wt % of the particles are smaller than the indicated value. It is determined by laser granulometry according to DIN ISO 13320:2009. For this purpose, the MgO meal is dispersed in ethanol using ultrasound.

In addition, the used MgO meal, preferably the used caustic MgO meal preferably contains at least 88 wt %, preferably at least 95 wt %, MgO, particularly preferably at least 97 wt % MgO, determined using X-ray fluorescence analysis (XRF) according to DIN 12677:2013-02. In addition, the used MgO meal, preferably the used caustic MgO meal, preferably contains a maximum of 4 wt %, preferably a maximum of 2 wt %, CaO, determined using X-ray fluorescence analysis (XRF) according to DIN 12677:2013-02.

The MgO meal, preferably the caustic MgO meal, is in addition pressed in a standard press, preferably a pelleting press or briquetting press or hydraulic press, in such a way that the pressed articles have a bulk density, according to DIN 66133:1993-06, of 1.8 to 2.3 g/cm$^3$, preferably 1.9 to 2.2 g/cm$^3$, and/or a porosity, according to DIN 66133:1993-06, of 32 to 52 vol %, preferably 35 to 45 vol %. The pressed articles are preferably pellets. However, they can also advantageously be briquettes or bricks.

Thereby preferably, exclusively the MgO meal, preferably the caustic MgO meal, is pressed, if applicable with the addition of some water, i.e. without a binder and thus without any burnout materials.

The pressed articles thus consist, with regard to their dry mass, preferably of at least 96 wt %, more preferably of at least 98 wt %, particularly preferably of 100 wt %, of MgO meal, preferably of caustic MgO meal.

In particular, the pressed articles do not contain any magnesite meal.

As explained above, the firing duration and the sintering temperatures are set such that the granular material according to the present invention made of porous sintered magnesia has a grain porosity (total porosity) according to DIN 993-18:2002-11 and DIN 993-1:1995-4 of 15 to 38 vol %, preferably 20 to 38 vol %, and preferably has a grain bulk density according to DIN 993-18:2002-11 of 2.20 to 2.85 g/cm$^3$, preferably 2.20 to 2.75 g/cm$^3$. This also holds for the other properties of the granular material.

In particular, the granular material according to the present invention made of porous sintered magnesia preferably has a small average pore diameter $d_{50}$ of 0.1 to 10 μm, preferably of 2 to 8 μm, determined in accordance with DIN 66133:1993-06. Thereby the pore diameter distribution can be monomodal (see FIG. 1).

Figure 3:
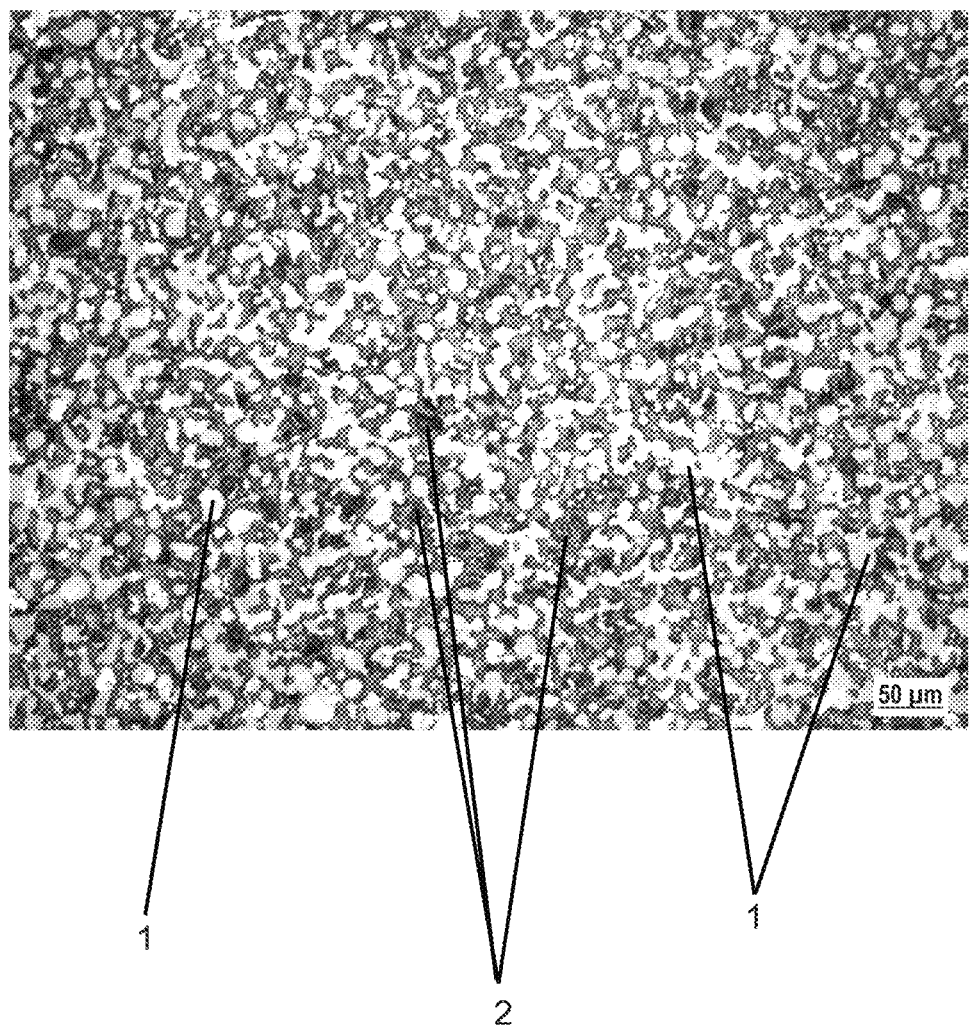
FIG. 3 shows a light microscopic image (reflected light) of a sintered magnesia according to the present invention, sintered in an HT kiln at 1530° C., firing duration 6 h.

FIG. 3 shows the microstructure of the sintered magnesia according to the present invention. It has a homogenous distribution of magnesia particles 1 and small pores 2. No larger pores are visible. The brighter pores 2 are pores filled with epoxy resin, the somewhat darker pores 2 are unfilled.

The granular material according to the present invention made of porous sintered magnesia additionally has a grain compression strength, based on DIN 13055:2016-11 (10 mm instead of 20 mm) of 10 to 30 MPa, preferably 11 to 25 MPa.

The granular material made of porous sintered magnesia according to the present invention in addition preferably has the following thermal conductivity values (TC), in accordance with DIN EN 821-2:1997-08:

TABLE 1

Preferred thermal conductivity values of the sintered magnesia according to the present invention

| TC | | preferably |
|---|---|---|
| 400° C. [W/mK] | 3 to 9 | 4 to 8 |
| 800° C. [W/mK] | 2 to 7 | 3 to 6 |
| 1200° C. [W/mK] | 2 to 7 | 3 to 6 |

The granular material according to the present invention is distinguished in particular by the following properties:

TABLE 2

Properties of porous sintered magnesia according to the present invention and of dense sintered magnesia

| | Sintered magnesia according to the present invention | Conventional dense sintered magnesia |
|---|---|---|
| Grain bulk density [g/cm$^3$] | 2.20-2.85 | 3.15-3.46 |
| Grain porosity [vol %] | 11-40 | 4-10 |
| MgO [wt %] | 88->99 | 88->99 |
| $Al_2O_3$ [wt %] | <1 | <1 |
| $Fe_2O_3$ [wt %] | 0.1-8 | 0.1-8 |
| CaO [wt %] | 0.3-8 | 0.3-8 |
| $SiO_2$ [wt %] | 0.2-5 | 0.2-5 |
| TC | | |
| 400° C. [W/mK] | 5.84 (≤9) | 13.29 (>9) |
| 800° C. [W/mK] | 3.71 (≤7) | 8.33 (>7) |
| 1200° C. [W/mK] | 3.41 (≤7) | 7.22 (>7) |

As explained above, the sintered magnesia according to the present invention is used in batches according to the present invention for the production of shaped or unshaped refractory products according to the present invention.

A batch according to the present invention comprises a dry material mixture containing the sintered magnesia, and binder. That is, the quantity of binder (dry or liquid) is additively added, and relates to the total dry mass of the dry material mixture. If applicable, another liquid additive, also added additively, and also relating to the total dry mass of the dry material mixture, can be contained. Preferably, the batch consists of at least 90 wt %, more preferably of at least 99 wt %, particularly preferably of 100 wt %, of binder and the dry material mixture, relative to the total mass of the batch.

The dry material mixture preferably comprises the following components, related in each case to the total dry mass of the dry material mixture (the quantity indications indicate in each case the total sum of the respective components, i.e. for example the total amount of coarse granular material of sintered magnesia according to the present invention, the total amount of powdered granular material, or of further granular material):

a) at least one coarse granular material made of the sintered magnesia according to the present invention having a grain size >200 μm, preferably in a quantity of 10 to 90 wt %, more preferably of 20 to 80 wt %
b) at least one powdered granular material made of magnesia, e.g. of the sintered magnesia according to the present invention, having a grain size ≤200 μm, preferably in a quantity of 90 to 10 wt %, more preferably of 80 to 20 wt %
c) if applicable, at least one further granular material made of a refractory material, preferably in a total quantity of additional granular material of 0.5 to 40 wt %, preferably of 3 to 30 wt %
d) if applicable, at least one additive for refractory materials, preferably in a total quantity <5 wt %
e) if applicable, at least one admixture for refractory materials, preferably in a total quantity of <5 wt %.

The components can be contained in any combination in the dry material mixture.

In addition, as already explained, the batch according to the present invention contains, additively to the dry material mixture, at least one liquid or solid binder for refractory materials, preferably in a total quantity of 1 to 9 wt %, preferably 2.5 to 6 wt %, relative to the dry total mass of the dry material mixture.

In the case of unshaped products, the liquid binder is preferably packed in a container separate from the dry components of the batch.

In addition, the coarse granular material made of the sintered magnesia according to the present invention preferably has a grain size of up to a maximum of 8 mm, more preferably up to a maximum of 6 mm, particularly preferably up to a maximum of 4 mm.

The grain distribution of the coarse granular material made of the sintered magnesia according to the present invention and/or of the dry material mixture according to the present invention, is preferably steady, preferably in accordance with a Litzow, Furnas, or Fuller curve, or has a Gaussian distribution.

The further granular material is preferably made up of an elastifying raw material, i.e. a raw material that is typically used to lower the modulus of elasticity.

Preferably, the further granular material consists of a raw material from the following group: Magnesium aluminate spinel, bauxite, alumina, hercynite, pleonaste, chromium ore, pleonastic spinel, zirconium oxide, olivine, and/or forsterite.

The present invention succeeds quite particularly effectively with a dry material mixture of the following materials:
magnesia
magnesia with magnesium aluminate spinel
magnesia with hercynite
magnesia with forsterite
magnesia with pleonaste or pleonastic spinel
magnesia with chromium ore
magnesia with zirconium oxide.

As explained, combinations of various further granular materials are also possible, preferably a combination of a further granular material of hercynite with a further granular material of magnesium aluminate spinel.

In addition, the further granular material preferably has a maximum grain size of ≤8 mm, more preferably ≤6 mm, particularly preferably ≤4 mm.

The dry binder is a binder suitable for refractory products. These binders are indicated for example in the Practical Handbook, page 28/point 3.2.

Preferably, the liquid binder is a binder from the following group: thermally curing synthetic resin binder, in particular phenol formaldehyde resin, or molasses or lignin sulfonate or a sulfur-free binder, in particular a binder based on dextrose, an organic acid, saccharose, an $Al_2O_3$ binder, phosphoric acid, a phosphate binder, water glass, ethyl silicate, or a sulfate, e.g. magnesium sulfate or aluminum sulfate, or a sol-gel system.

The dry additive is an additive suitable for refractory products. These additives are indicated for example in the Practical Handbook, page 28/point 3.3. They are used to improve processability or deformability, or to modify the microstructure of the products and in this way to achieve particular properties.

As already explained, the batch according to the present invention is used to produce refractory shaped or unshaped products according to the present invention.

For the production of shaped products, in particular bricks, a mixture or plastic mass is produced from the dry material mixture of the batch according to the present invention, with at least one liquid and/or solid binder and/or water. If the batch contains a liquid binder, the addition of water is not necessary, but is possible.

For the optimal distribution of the binder or binders, and/or of the water, mixing takes place for e.g. 3 to 10 minutes.

The mixture is poured into molds and is pressed so that shaped bodies are formed. The molding pressures are within standard ranges, e.g. 60-180 MPa, preferably 100-150 MPa.

Preferably, after pressing a drying is carried out, e.g. at between 60 and 200° C., in particular between 90 and 140° C. The drying preferably takes place until there is a residual moisture between 0.1 and 0.6 wt %, in particular between 0.2 and 0.5 wt %, determined according to DIN 51078:2002-12.

Thus, in context of the present invention it has turned out that the production of shaped bodies is possible using standard molding pressures in order to achieve the named porosities with the corresponding mechanical and thermal properties. Apparently, the porosity of the sintered magnesia according to the present invention, used in particular in standard granulations in accordance with the Fuller or Litzow grain distribution of the material mixtures, in the overall granular material mixture ensures that, in particular during pressing, the pore volume according to the present invention can form without the grains having to form a support framework in the microstructure as described in DE 10 2013 020 732 A1.

The shaped bodies according to the present invention, in particular the bricks, can be used in unfired form or in tempered form or in fired form. Preferably, however, they are used in fired form.

The green pressed bricks are tempered in a ceramic burning kiln, e.g. a tunnel kiln, at between 400 and 100° C., in particular between 500 and 800° C.

For the firing, the preferably dried pressed bricks are ceramically fired in a ceramic burning kiln, e.g. a tunnel kiln, preferably at between 1200 and 1800° C., in particular between 1400 and 1700° C. Preferably, firing is done in oxidizing fashion, but, depending on the material composition, a reducing firing may also be advantageous.

The thermal conductivity, according to the hot-wire (parallel) method according to DIN 993-15:2005-14, of the fired shaped products according to the present invention, in particular the bricks, is preferably 4.0 to 6.0 W/mK, more preferably 4.5 to 5.8 W/mK, at 300° C., 3.0 to 5.0 W/mK, more preferably 3.0 to 4.8 W/mK, at 700° C. and 2.0 to 3.5 W/mK, more preferably 2.0 to 3.2 W/mK, at 1000° C.

The fired, shaped products, in particular the bricks, preferably have a high open porosity of 22 to 45 vol %, more preferably 23 to 35 vol %, determined according to DIN EN 993-1:1995-04.

In addition, they preferably have a mean value $d_{50}$ of the pore size distribution (diameter), determined according to DIN 66133:1993-06, of 0.5 to 10 µm, preferably 2 to 8 µm.

In addition, the fired, shaped products, in particular the bricks, preferably have a low bulk density of 1.9 to 2.9 $g/cm^3$, in particular 2.0 to 2.8 $g/cm^3$, determined according to DIN 993-1:1995-04.

The cold compression strength according to DIN EN 993-5:1998-12 of the fired shaped products according to the present invention, in particular the bricks, is preferably 30 and 100 MPa, in particular 45 and 90 MPa. The cold bending strength according to DIN EN 993-6:1995-04 of the fired shaped products according to the present invention, in particular the bricks, is preferably 2 to 18 MPa, in particular 3 to 10 MPa.

The gas permeability according to DIN EN 993-4:1995-04 of the fired shaped products according to the present invention, in particular the bricks, is preferably 0.2 to 8 nPm, in particular 0.5 to 6 nPm.

The resistance to thermal shock, determined according to DIN EN 993-11:2008-03, in air at an elevated testing temperature of 1100° C. of the fired shaped products according to the present invention, in particular the bricks, is preferably >20 quenching cycles, in particular >30 quenching cycles.

For the production of unshaped products, in particular masses, preferably injection masses or vibration masses or casting masses or stoker masses, a mixture is likewise produced from the dry material mixture according to the present invention, with at least one dry and/or liquid binder and/or water. If the batch contains a liquid binder, the addition of water is not necessary, but is possible.

Figure 2:
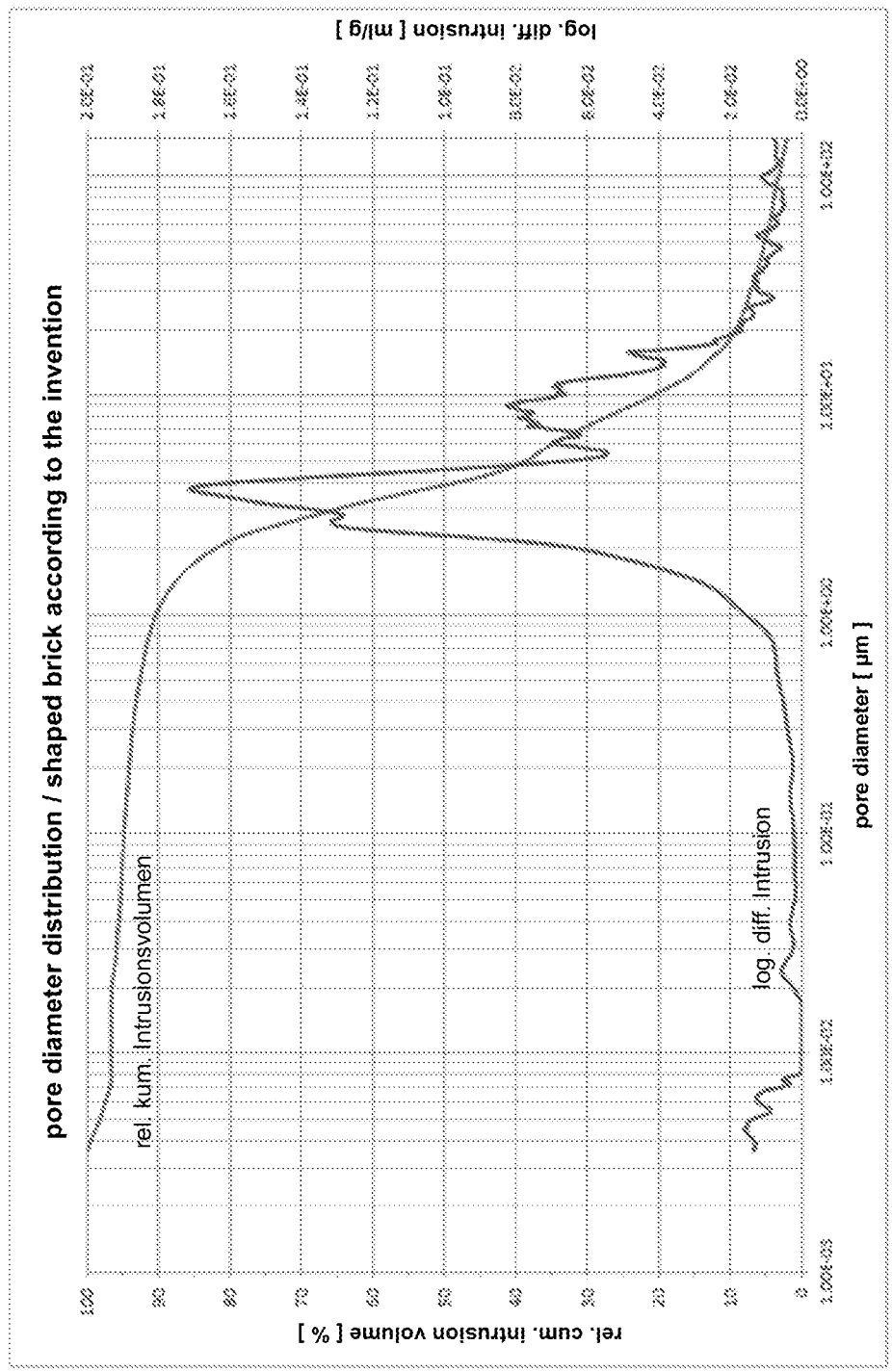
FIG. 2 shows, as an example, a pore diameter distribution of a shaped brick according to the present invention.

In sum, the present invention provides refractory products that are highly porous but are outstandingly suitable for use as working casings and also as backings, with regard to thermal conductivity and pore size, and thus gas permeability. Particularly advantageous is the low average pore diameter $d_{50}$ of the sintered magnesia according to the present invention, which is preferably 2-8 µm and which is also present in the produced product alongside the average pore diameter $d_{50}$ of the matrix of approximately 4 µm (see FIG. 2).

The shaped, in particular pressed, or unshaped coarse ceramic refractory products according to the present invention can be used as working casings in a fired industrial furnace aggregate despite their high porosity, because they have the required mechanical, thermomechanical, and thermochemical working casing properties.

The use of fine particulate material, approximately 50-90 wt % with $d_{90}$<100 µm, is not necessary, rather, granulations of up to 8 mm, which are standard in refractory technology, may be used. In this way, the production effort for providing the granular material is reduced, in particular the grinding comminution energy.

In addition, $CO_2$ emissions are reduced due to the lower firing temperature of the sintered magnesia according to the present invention. According to the present invention, the addition of burnout materials, which is very complex, to integrate the burnout materials into the batch in homogenous fashion, and which also increases environmental impact due to $CO_2$ emissions, can be omitted.

In addition, the savings of material and weight for a volume to be lined is to be considered a positive factor.

Up to now, the reduction of the thermal conductivity of refractory linings was usually brought about through multilayer casing configurations made of working layers and insulating layers. Particularly in moving aggregates, such as cement rotary kilns, multilayer linings are mechanically very sensitive, or susceptible to breakage. Moreover, their installation is complicated. In order to avoid uncertainty during operation resulting from so-called intermediate layer casings, the installation of working casings not having an insulating layer is therefore not unusual. However, this is associated with higher temperatures, which stress the material of an aggregate cladding, and higher heat losses. A working casing according to the present invention can be used with outstanding results even without an intermediate layer, in particular due to its low thermal conductivity.

On the basis of the following examples, the superiority of coarse ceramic products according to the present invention, compared to products according to the closest existing prior art according to DE 10 2013 020732 A1 and compared to known dense products, is illustrated.

Production of the Sintered Magnesia According to the Present Invention for Examples 1 to 3:

The production of the granular material made of the porous sintered magnesia was done as follows:

A filter cake obtained from a $Mg(OH)_2$ suspension using a vacuum press, having a solids amount >50%, was dried in a kiln and subsequently calcinated at 1100° C. and comminuted, so that a caustic magnesia was obtained from the $Mg(OH)_2$, whose typical particle size distribution $d_{50}$ was =10 μm.

Using a pelleting press, the caustic magnesia was pressed to form almond-shaped pellets having dimensions of 13×20×30 mm³. These green pellets had a grain bulk density of 2.0 g/cm³.

These pellets were sintered in a high-temperature laboratory kiln with a temperature profile in which the temperature was increased by 2 K/min until 800° C. was reached. After a holding time of 6 h, the temperature was further increased by 2 K/min to 1450° C. The holding time at this temperature was 5 h. Cooling took place continuously through heat dissipation from the high-temperature laboratory kiln to the surrounding environment.

Subsequently, the porous sintered magnesia was broken up and classified by sieving.

The granular material according to the present invention made of the porous sintered magnesia had a grain bulk density of 2.59 g/cm³. The corresponding open porosity was 25.8 vol % (DIN EN 993-18:2002-11; DIN EN 993-1:1995-04).

Example 1

In Example 1, bricks were produced based on the same materials and the same mineralogical composition (84 wt % magnesia, 16 wt % sintered spinel, magnesia meal made of dense sintered magnesia):

TABLE 3

Composition of the batches for Example 1

| | Bricks a) | Bricks b) | Bricks c) |
|---|---|---|---|
| Sintered magnesia according to the present invention [wt %], 0-4 mm | 54 | | |
| Dense sintered magnesia [wt %], 0-4 mm | | 54 | 10 |
| Dense sintered magnesia [wt %], 0.1-0.5 mm | | | 32 |
| Sintered spinel [wt %], 0-4 mm | 16 | 16 | 16 |
| Magnesia meal, ≤200 μm | 30 | 30 | 42 |
| Binder lignin sulfonate [wt %, relative to dry mass] | 3.7 | 3.7 | 6 |
| Compression [MPa] | 130 | 130 | 40 |
| Firing temperature [° C.] | 1600 | 1600 | 1600 |

The used raw materials had the following properties:

TABLE 4

Properties of the sintered magnesia according to the present invention
Sintered magnesia according to the present invention

| | |
|---|---|
| Grain bulk density according to DIN 993-1: 1995-04, 993-18: 2002-11 | 2.59 g/cm³ |
| Grain porosity according to DIN 993-1: 1995-04, 993-18: 2002-11 | 25.8 vol % |

TABLE 5

Properties of the dense sintered magnesia for bricks b) and c)
Dense sintered magnesia

| | |
|---|---|
| Grain bulk density according to DIN 993-1: 1995-04, 993-18: 2002-11 | 3.41 g/cm³ |
| Grain porosity according to DIN 993-1: 1995-04, 993-18: 2002-11 | 1 Vol.-% |

TABLE 6

Properties of the sintered spinel for bricks a), b) and c)
Sintered spinel

| | |
|---|---|
| Grain bulk density according to DIN 993-1: 1995-04, 993-18: 2002-11 | 3.37 g/cm³ |
| Grain porosity according to DIN 993-1: 1995-04, 993-18: 2002-11 | 2 vol %[5] |

The production of the bricks a)-c) took place in each case as follows:

The corresponding raw materials according to Table 3, having a grain size distribution according to Fuller, were mixed dry in a mixer for 3 minutes, provided with the liquid binder, and further mixed for 5 minutes. The mixture was brought to a hydraulic press and was pressed in a B format for rotary kiln bricks, with a molding pressure as shown in Table 3. The bricks were dried in a dryer at approximately 130° C. and were subsequently fired in oxidizing fashion at 1600° C. in a tunnel kiln for 50 hours. The holding time at the maximum temperature was 5 h. The firing shrinkage was determined by measuring, the final bulk density was determined by measuring and weighing, the porosity was determined according to DIN EN 993-1:1995-04, the cold compression strength was determined according to DIN EN 993-5:1998-12, the cold bending strength was determined according to DIN EN 993-6:1995-04, the gas permeability was determined according to DIN EN 993-4:1995-04, and the thermal conductivity was determined according to the hot-wire (parallel) method DIN 993-15:2005-14. The resistance to thermal shock was determined according to DIN EN 993-11:2008-03 in air at an elevated test temperature of 1100° C.:

TABLE 7

Properties of the fired bricks of Example 1

| | Bricks a) | Bricks b) | Bricks c) |
|---|---|---|---|
| Bulk density [g/cm³] | 2.68 | 2.95 | 2.63 |
| Porosity [vol %] | 24.1 | 16.0 | 25.2 |
| Cold compression strength [MPa] | 88 | 70 | 80 |
| Cold bending strength [MPa] | 5.98 | 5.6 | 6.0 |
| Gas permeability [nPm] | 0.85 | 1.6 | 1.2 |
| Firing shrinkage [%] | 1.18 | 0.30 | 0.60 |

TABLE 7-continued

Properties of the fired bricks of Example 1

|  | Bricks a) | Bricks b) | Bricks c) |
|---|---|---|---|
| Pore diameter $d_{50}$ [µm] | 3.8 | 14.2 | 10.4 |
| TSR [cycles] | >30 | >30 | >30 |
| TC |  |  |  |
| 300° C. [W/mK] | 5.4 | 6.7 | 5.5 |
| 700° C. [W/mK] | 3.5 | 5.1 | 3.6 |
| 1000° C. [W/mK] | 2.6 | 4.0 | 2.8 |

Compared to the conventional dense bricks according to b), the brick properties change in the case of a) and also of c), where the bricks have a significantly higher porosity and a significantly reduced bulk density, without having a negative influence on the other brick properties. In particular, the gas permeability and the pore diameter are reduced in the bricks according to the present invention.

In the case of a) according to the present invention, in which the granular material is made up of porous magnesia according to the present invention, the reduction of the bulk density and the increase in the open porosity are considerable compared to b).

In addition, the average pore diameter $d_{50}$ is dramatically reduced in comparison with b) and c), so that there is a reduced tendency to infiltration by alkalis and clinker melts. In comparison with b), the cold compression strength and cold bending strength continue to be reliably in the range typical for dense bricks. The resistance to thermal shock is, at >30 quench cycles, at the same required high level without breakage for all brick types.

In addition, for bricks according to the present invention according to a), the results show significantly reduced thermal conductivity values compared to the dense magnesia spinel bricks b).

Example 2

For Example 2, bricks d), a porous spinel was used instead of the sintered spinel of Example 1:

TABLE 8

Composition of the batches for Example 2

|  | Bricks a) | Bricks b) | Bricks d) |
|---|---|---|---|
| Magnesia according to the present invention [wt %], 0-4 mm | 54 |  | 54 |
| Dense sintered magnesia [wt %], 0-4 mm |  | 54 |  |
| Sintered spinel [wt %], 0-4 mm | 16 | 16 |  |
| Porous sintered spinel, 0-4 mm |  |  | 16 |
| Magnesia meal ≤200 µm | 30 | 30 | 30 |
| Binder lignin sulfonate [wt %, relative to dry mass] | 3.7 | 3.7 | 3.7 |
| Compression [MPa] | 130 | 130 | 40 |
| Firing temperature [° C.] | 1600 | 1600 | 1600 |

The properties of the magnesia according to the present invention for d) correspond to those of Example 1.

TABLE 9

Properties of the porous sintered spinel for bricks d)

| Porous sintered spinel |  |
|---|---|
| Grain bulk density according to DIN 993-1: 1995-04, 993-18: 2002-11 | 2.66 g/cm³ |
| Grain porosity according to DIN 993-1: 1995-04, 993-18: 2002-11 | 25 vol % |

The bricks d) were produced and tested analogously to Example 1:

TABLE 10

Properties of the fired bricks of Example 2

|  | Bricks a) | Bricks b) | Bricks d) |
|---|---|---|---|
| Bulk density [g/cm³] | 2.68 | 2.95 | 2.64 |
| Porosity [vol %] | 24.1 | 16.0 | 25.2 |
| Cold compression strength [MPa] | 88 | 70 | 85 |
| Cold bending strength [MPa] | 5.98 | 5.6 | 6.4 |
| Gas permeability [nPm] | 0.85 | 1.6 | 0.92 |
| Firing shrinkage [%] | 1.18 | 0.30 | 1.2 |
| Pore diameter $d_{50}$ [µm] | 3.8 | 14.2 | 4.2 |
| TSR [cycles] | >30 | >30 | >30 |
| TC |  |  |  |
| 300° C. [W/mK] | 5.4 | 6.7 | 5.2 |
| 700° C. [W/mK] | 3.5 | 5.1 | 3.3 |
| 1000° C. [W/mK] | 2.6 | 4.0 | 2.4 |

Compared to the bricks of Example 1, here the brick properties differ only slightly due to the use of porous magnesia and porous spinel, but a further reduced thermal conductivity can be seen. All other positive mechanical and thermal properties are maintained.

Example 3

In the first Examples 1 and 2, the advantages of the porous sintered magnesia according to the present invention for magnesia spinel bricks were explained. In order to demonstrate the effectiveness of the present invention in products made of other refractory materials, in Example 3 bricks based on sintered magnesia in combination with fused pleonaste (pleonastic fused spinel) were examined. Bricks e) were based on sintered magnesia according to the present invention, and bricks f), provided for comparison, were based on dense sintered magnesia. The production took place as in Example 1, at a firing temperature of 1450° C.:

TABLE 11

Composition of the batches for Example 3

|  | Steine e) | Steine f) |
|---|---|---|
| Magnesia according to the present invention [wt %], 0-4 mm | 54 |  |
| Dense sintered magnesia [wt %], 0-4 mm |  | 54 |
| Fused pleonaste [wt %], 0-4 mm | 16 | 16 |
| Magnesia meal ≤200 µm | 30 | 30 |
| Binder lignin sulfonate [wt %, relative to dry mass] | 3.7 | 3.7 |
| Compression [MPa] | 130 | 130 |
| Firing temperature [° C.] | 1450 | 1450 |

TABLE 12

Properties of the fused pleonaste for bricks e) and f)

| Fused pleonaste | |
|---|---|
| Grain bulk density according to DIN 993-1: 1995-04, 993-18: 2002-11 | 3.74 g/cm³ |
| Grain porosity according to DIN 993-1: 1995-04, 993-18: 2002-11 | 2 vol % |

The following table shows the results of Example 3:

TABLE 13

Properties of the fired bricks of Example 3

| | Steine e) | Steine f) |
|---|---|---|
| Bulk density [g/cm³] | 2.66 | 3.00 |
| Porosity [vol %] | 24.8 | 15.7 |
| Cold compression strength [MPa] | 98 | 100 |
| Cold bending strength [MPa] | 6.25 | 6.75 |
| Gas permeability [nPm] | 0.98 | 1.45 |
| Firing shrinkage [%] | 1.12 | 0.20 |
| Pore diameter $d_{50}$ [μm] | 4.8 | 14.6 |
| TSR [cycles] | >30 | >30 |
| TC | | |
| 300° C. [W/mK] | 5.3 | 6.9 |
| 700° C. [W/mK] | 3.4 | 5.3 |
| 1000° C. [W/mK] | 2.5 | 4.2 |

Table 4 shows that the porous sintered magnesia according to the present invention can also be used in magnesia pleonaste bricks, the porosity increases significantly due to the use of the sintered magnesia according to the present invention, and all positive mechanical and thermal properties are maintained.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A method for producing a granular material of sintered magnesia, comprising:
   sintering of pressed articles of MgO meal, the MgO meal having a grain size ≤200 μm, and
   subsequently mechanically comminuting the pressed articles to provide a granular material,
   wherein the sintering takes place in such a way that the granular material has a grain porosity (total porosity) according to DIN EN 993-1:1995-04 and DIN EN 993-18:2002-11 of 15 to 38 vol % and a grain compression strength, based on DIN 13055-2016-11 (10 mm instead of 20 mm), of 10 to 30 MPa,
   wherein the sintering takes place at a maximum temperature between 1100-1600° C. and wherein a firing duration at the maximum temperature is between 0.5 h to 7 h.

2. The method according to claim 1, wherein the sintering takes place at a maximum temperature between 1200-1600° C.

3. The method according to claim 1, wherein sintering takes place in such a way that the granular material has a grain bulk density, according to DIN EN 993-1:1995-04 and DIN EN 993-18:2002-11, of 2.20 to 2.85 g/cm³.

4. The method according to claim 1, wherein the pressed articles have a bulk density according to DIN 66133:1993-06 of 1.8 to 2.3 g/cm³.

5. The method according to claim 1, wherein the pressed articles have a porosity, according to DIN 66133:1993-06, of 32 to 52 vol %.

6. The method according to claim 1, wherein the MgO meal comprises at least 88 wt % MgO, determined by x-ray fluorescence analysis according to DIN 12677:2013-02.

7. The method according to claim 1, wherein the MgO meal has a particle size distribution having at least one of following values, determined using laser granulometry according to DIN ISO 13320:2009:
   $d_{90}$ between 80 and 100 μm; $d_{50}$ between 5 and 15 μm; or $d_{10}$ between 1 and 3 μm.

8. The method according to claim 1, wherein the pressed articles consist, relative to their dry mass, of at least 96 wt % of MgO meal.

9. The method according to claim 1, wherein the granular material made of sintered magnesia is produced without the use of burnout materials.

10. The method according to claim 1, wherein the sintering takes place in such a way that the granular material made of sintered magnesia has an average pore diameter $d_{50}$ of 0.1 to 10 μm, determined according to DIN 66133:1993-06.

11. The method according to claim 1, wherein the granular material made of sintered magnesia has a grain compression strength, based on DIN 13055-2016-11 (10 mm instead of 20 mm), of 11 to 25 MPa.

12. The method according to claim 1, further comprising: producing a batch from
   at least one granular material made of the granular material of sintered magnesia.

13. The method according to claim 12, wherein the batch comprises
   a dry material mixture having or consisting of:
   a) at least one coarse granular material made of the sintered magnesia the at least one coarse granular material and having a grain size >200 μm,
   b) at least one powdered granular material made of magnesia the at least one powdered granular material having a grain size ≤200 μm, and, an
   additive to the dry material mixture and, at least one liquid, or solid, binder for refractory materials.

14. The method according to claim 13, wherein the batch consists of at least 90 wt % of binder and the dry material mixture, relative to the total mass of the batch.

15. The method according to claim 13, wherein the dry material mixture comprises ≥50 wt % of the coarse granular material made of the sintered magnesia.

16. The method according to claim 13, wherein the coarse granular material made of the sintered magnesia has a maximum grain size ≤8 mm.

17. The method according to claim 13, wherein the dry material mixture further comprises a further granular material, and wherein the further granular material is selected from the group consisting of: magnesium aluminate spinel, bauxite, alumina, hercynite, pleonaste, chromium ore, pleonastic spinel, zirconium oxide, olivine, and/or forsterite.

18. The method according to claim 13, wherein the dry material mixture further comprises a further granular material having a maximum grain size ≤8 mm.

19. The method according to claim 16, wherein the dry material mixture further comprises a further granular material and wherein a grain distribution of the further granular material is steady.

20. The method according to claim 1, further comprising: coarse ceramic, refractory, shaped or unshaped product from the granular material of sintered magnesia.

21. The method according to claim 12 further comprising: forming a coarse ceramic, refractory, shaped or unshaped product, from the batch.

22. The method according to claim 20, wherein the product comprises a green, shaped body.

23. The method according to claim 20, wherein the product comprises a tempered shaped body.

24. The method according to claim 20, wherein the product comprises a fired shaped body.

25. The method according to claim 24, wherein the fired shaped body has a thermal conductivity according to the hot-wire (parallel) method according to DIN 993-15:2005-14 of 4.0 to 6.0 W/mK at 300° C., 3.0 to 5.0 W/mK at 700° C. and 2.0 to 3.5 W/mK at 1000° C.

26. The method according to claim 24, wherein the fired shaped body comprises an open porosity of 22 to 45 vol %, determined according to DIN 993-1:1995-4.

27. The method according to claim 24, wherein the fired shaped body has an average value of the pore diameter distribution $d_{50}$, determined according to DIN 66133:1993-06, of 0.5 to 10 μm.

28. The method according to claim 23, wherein the fired shaped body has a bulk density of 1.9 to 2.9 g/cm$^3$ determined according to DIN 993-1:1995-04.

29. The method according to claim 24, wherein the fired shaped body has a cold compression strength according to DIN EN 993-5:1998-12 of 30 to 100 MPa.

30. The method according to claim 24, wherein the fired shaped body has a cold bending strength according to DIN EN 993-6:1995-04 of from 2 to 18 MPa.

31. The method according to claim 23, wherein the fired shaped body has a gas permeability according to DIN EN 993-4:1995-04 of from 0.2 to 8 nPm.

32. The method according to claim 13, further comprising the steps of:
    a) mixing the dry material mixture with the at least one binder, water or both to form a plastic mass, and,
    b) shaping of the plastic mass to form a green shaped body.

33. The method according to claim 32, wherein the shaped body is fired at a temperature of 1200 to 1800° C.

34. The method according to claim 20 further comprising: forming a lining in a large-volume industrial furnace from the product.

35. The method according to claim 34, wherein the lining has a working casing that comprises the at least one product.

36. The method according to claim 35, wherein the working casing is installed in a one-layer or a multilayer masonry structure.

37. The method according to claim 34, wherein the lining has an insulating backing that comprises the at least one product.

38. The method according to claim 34, further comprising: forming the lining in a cement kiln installation, a lime shaft kiln or lime rotary kiln, a magnesite or dolomite kiln, or a heating kiln or a kiln for energy production or a kiln for steel production or a kiln of the nonferrous metal industry.

39. The method according to claim 1, wherein the pressed articles are pellets.

40. The method according to claim 1, wherein the pressed articles are made of caustic MgO meal.

41. The method according to claim 1, wherein the sintering takes place in such a way that the granular material has a grain porosity (total porosity) according to DIN EN 993-1:1995-04 and DIN EN 993-18:2002-11 of 20 to 38 vol %.

42. The method according to claim 1, wherein the firing duration at the maximum temperature is 2 h to 6 h.

43. The method according to claim 1, wherein the sintering takes place at a maximum temperature between 1200-1550° C.

44. The method according to claim 1, wherein the sintering takes place at a maximum temperature between 1200-1500° C.

45. The method according to claim 1, wherein sintering takes place in such a way that the granular material has a grain bulk density, according to DIN EN 993-1:1995-04 and DIN EN 993-18:2002-11, of 2.20 to 2.75/cm$^3$.

46. The method according to claim 1, wherein the pressed articles consist, relative to their dry mass, of 100 wt %, of MgO meal.

47. The method according to claim 1, wherein the pressed articles contain no magnesite meal.

* * * * *

UNITED STATES PATENT AND TRADEMARK OFFICE
CERTIFICATE OF CORRECTION

PATENT NO. : 11,440,847 B2
APPLICATION NO. : 16/646409
DATED : September 13, 2022
INVENTOR(S) : Hans-Jürgen Klischat et al.

It is certified that error appears in the above-identified patent and that said Letters Patent is hereby corrected as shown below:

In the Claims

Column 17, Claim 19, should read "The method according to claim 13..."

Column 17, Claim 28, should read "The method according to claim 24..."

Column 17, Claim 31, should read "The method according to claim 24..."

Signed and Sealed this
Thirteenth Day of June, 2023

*Katherine Kelly Vidal*

Katherine Kelly Vidal
*Director of the United States Patent and Trademark Office*